(12) United States Patent
Kweon

(10) Patent No.: US 6,580,922 B1
(45) Date of Patent: Jun. 17, 2003

(54) METHOD OF TRANSMITTING TELEPHONE NUMBER IN WIRELESS LOCAL LOOP SYSTEM

(75) Inventor: Sun Chan Kweon, Ichon (KR)

(73) Assignee: Hyundai Electronics Ind. Co., Ltd., Kyungki-do (KR)

( * ) Notice: Subject to any disclaimer, the term of this patent is extended or adjusted under 35 U.S.C. 154(b) by 504 days.

(21) Appl. No.: 09/643,978

(22) Filed: Aug. 22, 2000

(30) Foreign Application Priority Data

Dec. 24, 1999 (KR) ........................................ 1999-61711

(51) Int. Cl.$^7$ .............................. H04B 7/24; H04Q 7/34
(52) U.S. Cl. ...................... 455/554; 455/550; 455/426; 379/352
(58) Field of Search ................................ 455/550, 426, 455/561, 557, 552, 556, 403; 379/352, 355, 354, 356, 216

(56) References Cited

U.S. PATENT DOCUMENTS

| | | | | |
|---|---|---|---|---|
| 5,010,584 A | * | 4/1991 | Seki ........................... | 455/83 |
| 5,561,705 A | * | 10/1996 | Allard et al. ................ | 455/564 |
| 5,677,950 A | * | 10/1997 | Brendzel ................ | 379/355.03 |
| 5,819,177 A | * | 10/1998 | Vucetic et al. ............... | 455/425 |
| 5,953,675 A | * | 9/1999 | Rabina et al. .............. | 455/557 |
| 6,035,220 A | * | 3/2000 | Claudio et al. ............. | 455/564 |

* cited by examiner

Primary Examiner—Vivian Chin
Assistant Examiner—Kamran Afshar
(74) Attorney, Agent, or Firm—Merchant & Gould P.C.

(57) ABSTRACT

A method of transmitting a telephone number in a wireless local loop (WLL) system is provided for allowing a user to instantly hear a ring back tone by immediately performing a dialing in a WLL terminal when a flash signal is input by the user operating a hook switch after a telephone number is dialed in an ordinary telephone connected to the WLL terminal. The method checks the state of a hook switch of the ordinary telephone connected to the WLL terminal. When an off-hook sate is determined, it is determined whether a telephone number is input. When it is determined that a telephone number is input, the telephone number is stored in a dial buffer. It is continuously checked whether a flash signal is input while the input telephone number is being stored in the dial buffer. When the flash signal is input, the telephone number stored in the dial buffer is transmitted to the WLL system base station.

5 Claims, 2 Drawing Sheets

METHOD OF TRANSMITTING TELEPHONE NUMBER IN WIRELESS LOCAL LOOP SYSTEM

BACKGROUND OF THE INVENTION

1. Field of the Invention

The present invention relates to a method of transmitting a telephone number in a wireless local loop (WLL) system, and more particularly, to a method of transmitting a telephone number in a WLL system, for allowing a user to instantly hear a ring back tone by immediately performing a dialing in a WLL terminal when a flash signal is input by the user operating a hook switch after a telephone number is dialed in an ordinary telephone connected to the WLL terminal.

2. Description of the Related Art

Usually, when a terminal-type wireless local loop (WLL) terminal is used, it is connected to an ordinary telephone.

Since a send key is not provided in the ordinary telephone unlike a mobile communication terminal, the terminal-type WLL terminal performs a dialing when there is no key input a predetermined period time after it receives a dial signal from the ordinary telephone.

Accordingly, it takes more than 10 seconds for a ring back tone to be received when a user makes a phone call using the ordinary telephone connected to the WLL system. Consequently, the user always needs a certain waiting time until he/she can hear a ring back tone after inputting a telephone number.

SUMMARY OF THE INVENTION

It is, therefore, an object of the present invention to provide a method of transmitting a telephone number in a wireless local loop (WLL) system, for allowing a user to instantly hear a ring back tone by immediately performing a dialing in a WLL terminal when a flash signal is input by the user operating a hook switch after a telephone number is dialed in an ordinary telephone connected to the WLL terminal.

To achieve the above object, the present invention provides a method of transmitting a telephone number in a WLL system, including the steps of checking the state of a hook switch of the ordinary telephone connected to the WLL terminal, determining whether a telephone number is input, when an off-hook sate is determined, storing the telephone number in a dial buffer when it is determined that a telephone number is input, and continuously checking whether a flash signal is input while the input telephone number is being stored in the dial buffer, and transmitting the telephone number stored in the dial buffer to the WLL system base station when the flash signal is input.

The flash signal is generated when the hook switch is pressed in the off-hook state in the ordinary telephone, and is transmitted to the WLL terminal as a signal different from a telephone number signal.

The method of transmitting a telephone number in a WLL system also includes the steps of checking the state of the dial buffer when there is no input of telephone number in the off-hook state, operating a first timer for counting a first set time for determining the end of digits when it is determined that a telephone number is stored in the dial, and checking whether the first set time has elapsed, and transmitting the telephone number stored in the dial buffer to the WLL system base station when it is determined that the first set time has elapsed.

The method of transmitting a telephone number in a WLL system also includes the steps of checking the state of the dial buffer when there is no input of a telephone number in the off-hook state, and operating a second timer for counting a second set time for determining a time-out when any telephone number is not stored in the dial buffer, and transmitting a busy tone to an ordinary telephone when it is determined that the second set time has elapsed to allow a user to hear the busy tone.

The time-out is a function that is set for informing the user that the user did not input a telephone number for a predetermined period of time in the off-hook state.

BRIEF DESCRIPTION OF THE DRAWINGS

Further objects and advantages of the invention can be more fully understood from the following detailed description taken in conjunction with the accompanying drawings in which.

DETAILED DESCRIPTION OF THE PREFERRED EMBODIMENT

Referring to the accompanying drawings, a preferred embodiment of the present invention according to the above technical ideas will now be described in detail.

Figure 1:
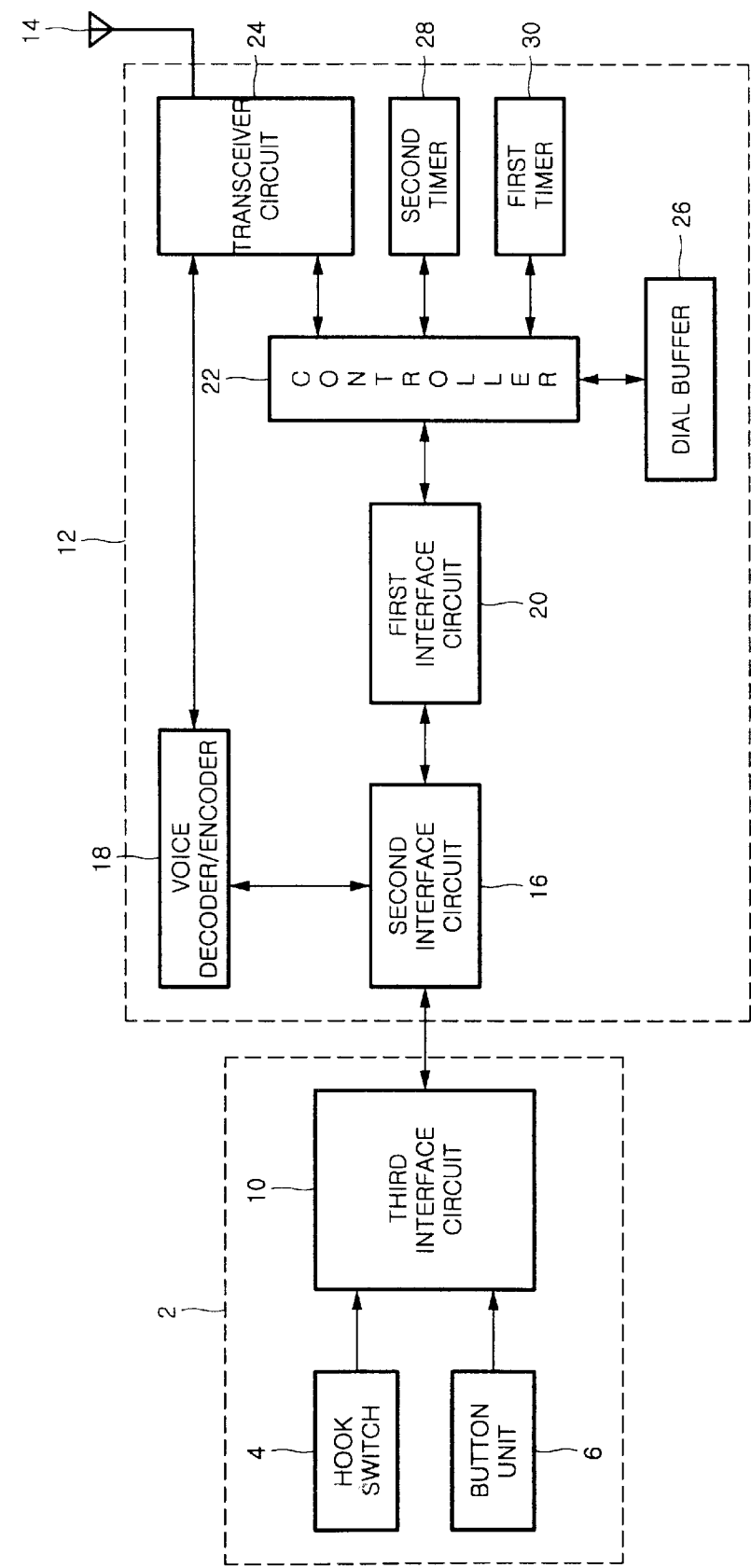
FIG. 1 is a block diagram showing the configuration of a telephone number transmitting apparatus to which a method of transmitting a telephone number in a wireless local loop (WLL) system according to the present invention is applied.

FIG. 1 is a block diagram partially showing the configuration of a wireless local loop (WLL) system to which a method of transmitting a telephone number in a WLL system according to the present invention is applied.

As shown in FIG. 1, the WLL system largely includes an ordinary telephone 2 and a WLL terminal 12.

The ordinary telephone 2 includes a hook switch 4, button unit 6 and a third interface circuit 10. The button unit 6 has a plurality of keys to allow a user to input a telephone number and is connected to the third interface circuit 10.

The hook switch 4 is connected to the third interface circuit 10 so that it can electrically connect the button unit 6 to the third interface circuit 10 or break this connection, and can input a flash signal, which indicates that a user completes the input of a telephone number that is performed by operating the keys provided in the button unit 6, to a controller 22 which will later be described.

Here, the flash is to break the hook switch 4 for 0.1–0.7 seconds. The flash is effected when the hook switch 4 is pressed for a short time in an off-hook state and then released to make the hook switch 4 go back to the original state (the off-hook state).

The ordinary telephone 2 indicates a telephone that is owned by a user who is a telephone subscriber. The ordinary telephone 2 is connected to the WLL terminal 12, which will later be described, so as to perform telephone communication through wireless connection.

The WLL terminal 12 includes a second interface circuit 16 for interfacing a WLL system base station (not shown) and the ordinary telephone 2 with voice data such that the second interface circuit 16 receives a voice signal from the ordinary telephone 2 and transmits it to the WLL system base station through an antenna 14, and receives voice data from the WLL system base station through the antenna 14 and transmits it to the ordinary telephone 2, and for transmitting telephone number data and a flash signal, which are received from the ordinary telephone 2, to the WLL system base station; a voice decoder/encoder (vocoder) 18 for coding and decoding voices; a first interface circuit (subscriber line interface circuit: SLIC) 20 connected to the second interface circuit 16, for transmitting the telephone number data and the flash signal, which are received from the ordinary telephone 2, to the controller 22, which will later be described; the controller 22 for controlling storing of the telephone number transmitted from the first interface circuit 20, sending of the stored telephone number, and the overall operation of the WLL terminal 12; a transceiver circuit 24 for processing a wireless signal; a dial buffer 26 for storing the telephone number; a first timer 30 for counting a first set time predetermined for determining the end of digits; and a second timer 28 for counting a second set time predetermined for determining a time-out.

The voice decoder/encoder (vocoder) 18 decodes voice data received from the transmitter (not shown) of the ordinary telephone 2 through the third interface circuit 10 of the ordinary telephone 2 and the second interface circuit 16 of the WLL terminal 12. The voice decoder/encoder 18 also encodes voice data received from the WLL system base station through the transceiver circuit 24.

The transceiver circuit 24 transmits the voice data from the voice decoder/encoder 18 to the WLL system base station through the antenna 14 in response to a control signal output from the controller 24. The transceiver circuit 24 also outputs voice data, which is received from the WLL system base station through the antenna 14, to the voice decoder/encoder 18.

The dial buffer 26 is connected to the controller 22 and serves as a memory for temporarily storing a telephone number, which is input by a user operating keys provided in the button unit 6 of the ordinary telephone 2 and received through the controller 22.

The first timer 30 outputs a time signal to the controller 22 when a flash signal is not received from the hook switch 4 so that the telephone number stored in the dial buffer 26 can be transmitted to the base station under the control of the controller 22.

The second timer 28 outputs a time signal to the controller 22 when a telephone number is not input from the button unit 6 in an off-hook state so that a busy tone can be output to the receiver of the ordinary telephone 2. The busy tone is generated for informing a user that the transceiver of the ordinary telephone 2 is not exactly hung up.

A method of transmitting a telephone number in a WLL system according to the present invention will now be described in detail with reference to such a system configuration, to which the present invention is applied, as described above.

Figure 2:
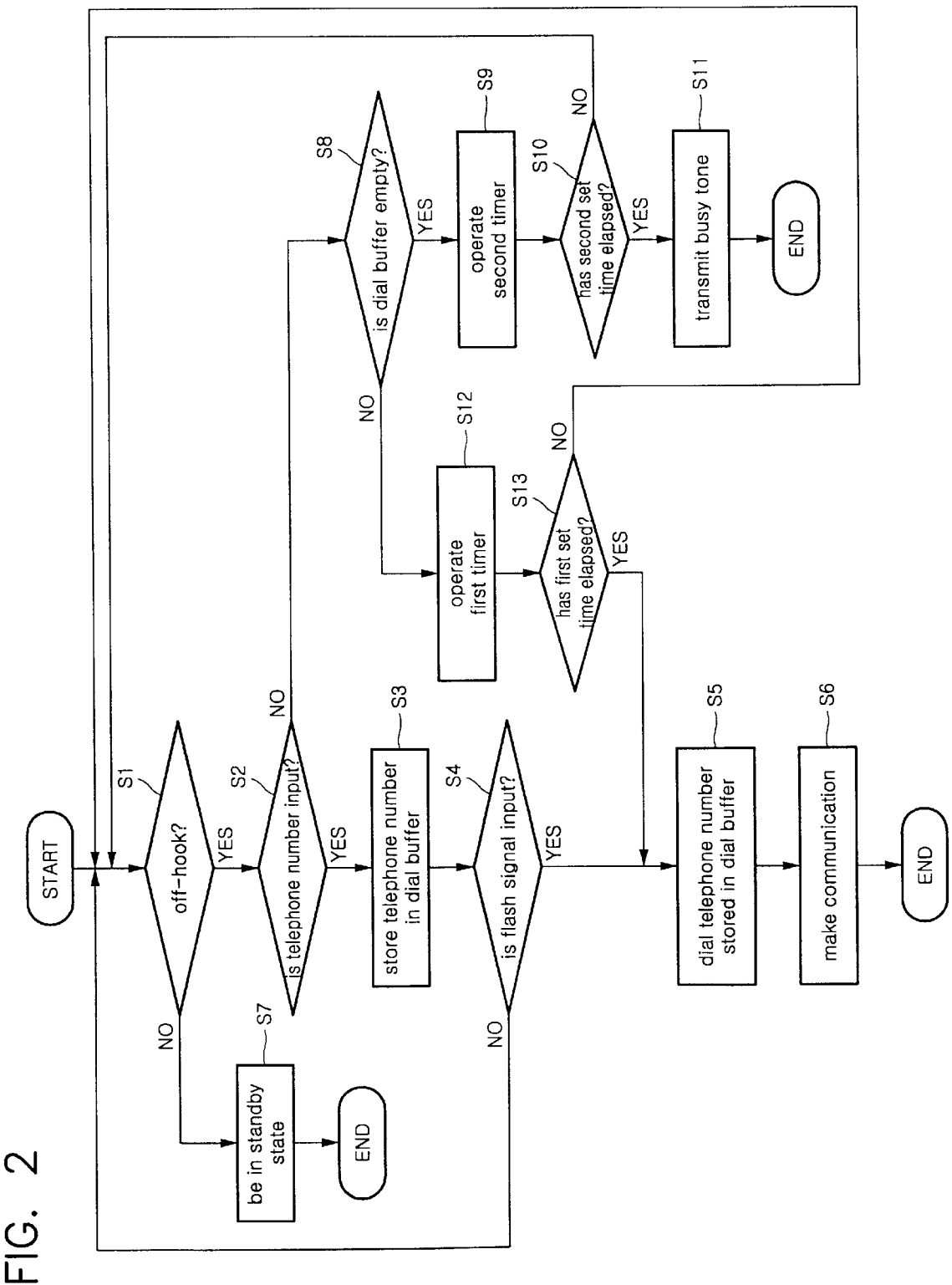
FIG. 2 is a flowchart showing a method of transmitting a telephone number in a WLL system according to the present invention.

FIG. 2 is a flowchart showing a method of transmitting a telephone number in a WLL system according to the present invention.

As shown in FIG. 2, the method includes the steps of (S1) checking the state of a hook switch, (S7) maintaining a stand-by state when it is determined that the hook switch is in an on-hook state, (S2) checking whether a telephone number is input when it is determined that the hook switch is in an off-hook state, (S3) storing a telephone number in a dial buffer when it is determined that the telephone number is input, (S4) checking whether a flash signal is input while the input telephone number is being stored in the dial buffer, (S5) transmitting the telephone number stored in the dial buffer to a WLL system base station when it is determined that the flash signal is input, and (S6) making a communication connection by forming a talking path when a called party receives an incoming call after the telephone number is transmitted.

The method of transmitting a telephone number in a WLL systems according to the present invention may also includes the steps of (S8) checking the state of the dial buffer when there is no input of telephone number in the off-hook state, (S12) operating a first timer for counting a first set time for determining the end of digits when it is determined that a telephone number is stored in the dial buffer as a result of checking the state of the dial buffer, and (S13) checking whether the first set time has elapsed, and returning to step (S5) of transmitting the telephone number stored in the dial buffer to the WLL system base station when it is determined that the first set time has elapsed.

In addition, the method of transmitting a telephone number in a WLL system according to the present invention may also includes the steps of (S9) operating a second timer for counting a second set time for determining a time-out when any telephone number is not stored in the dial buffer as a result of checking the state of the dial buffer when there is no input of a telephone number in the off-hook state, and (S10 and s11) checking whether the second set time has elapsed and transmitting a busy tone to an ordinary telephone when it is determined that the second set time has elapsed, to allow a user to hear the busy tone.

Such a method of transmitting a telephone number in a WLL system according to the present invention will be described more specifically with reference to FIGS. 1 and 2.

Primarily, as an initial condition, it is assumed that the hook switch 4 is in a state which is made by exactly putting the transceiver of the ordinary telephone 2 on a predetermined position in the body of the ordinary telephone 2, that is, in an on-hook state. Accordingly, the button unit 6 is electrically disconnected from the third interface circuit 10.

In this condition, it is determined whether the hook switch 4 is in the on-hook state in step S1.

When it is determined that the hook switch 4 is in the on-hook state, the procedure goes to step S7 to maintain the present on-hook state.

When it is determined that the hook switch 4 is in an off-hook state, that is, when a user picks up the transceiver of the ordinary telephone 2 to make a call, it is determined whether a telephone number is input in step S2.

When the user inputs a digit in a telephone number by pressing a corresponding key provided in the button unit 6, a key signal corresponding to the digit is converted into a dual tone multifrequency (DTMF) signal in the third interface circuit 10 and transmitted to the WLL terminal 12. The second interface circuit 16 of the WLL terminal 12 transmits the DTMF signal to the first interface circuit 20.

The first interface circuit 20 converts the DTMF signal into data, which the controller 22 can recognize, and inputs the data into the controller 22. When the input data is recognized as the digit of a telephone number, the controller 22 temporarily stores the digit in the dial buffer 26 in step S3.

With such an arrangement, whenever the user presses a key provided in the button unit 6, a corresponding digit of the telephone number is stored in the dial buffer 26.

The controller 22 checks whether a flash signal is input while storing the digits of the telephone number, which are input by the user, in the dial buffer 26.

When the user presses the hook switch 4 and immediately releases it after completing the input of the telephone number, the third interface circuit 10 generates a square wave signal as a flash signal. The square wave signal is different from the signal generated for the telephone number. The third interface circuit 10 transmits the square wave signal as a flash signal to the second interface circuit 16 of the WLL terminal 12.

Then, the first interface circuit 20 converts the square wave signal received through the second interface circuit 16 into data and inputs the data into the controller 22.

Accordingly, the controller 22 can determine whether a flash signal is input based on whether the data corresponding to the square wave is input.

When it is determined that the flash signal is input, the controller 22 dials the telephone number stored in the dial buffer 26 in step S5.

The dialed telephone number is modulated into a wireless signal by the transceiver circuit 24 and transmitted to the WLL system base station through the antenna 14.

Thereafter, when a called party receives an incoming call, a talking path is formed so that communication can be established.

After the dialing is performed, the telephone number stored in the dial buffer 26 is removed.

In other words, a telephone number transmitting method according to the present invention makes the hook switch 4 of the ordinary telephone 2 serve as a send key used in a digital cellular system (DCS) or a personal communication system (PCS), thereby allowing a WLL system subscriber to instantly hear a ring back tone after inputting a telephone number without waiting for a long time.

Alternatively, it is determined that there is no input of a telephone number in step S2, the controller 22 checks whether any telephone number is stored in the dial buffer 26.

When it is determined that a telephone number is stored in the dial buffer 26, the first timer 30 for counting the first set time is operated to determine the end of digits of the telephone number in step S112.

Since the ordinary telephone 2 connected to the WLL terminal 12 does not have a send key used in a mobile communication terminal, it cannot generate a signal indicating the end of the input of a telephone number. Accordingly, the end of the input of a telephone number is referred to as the end of digits and is recognized based on the lapse of a predetermined period of time for which any key input is not generated since the last digit was input.

The controller 22 receives a counting time from the first timer 30 after operating the first timer 30 and compares the input counting time with the predetermined first set time to check whether the first set time has elapsed, in step S113.

When it is determined that the first set time has elapsed, it is determined that the input of the telephone number is terminated, and the telephone number stored in the dial buffer 26 is dialed in step S5.

In this case, the telephone number stored in the dial buffer 26 is also removed after it is dialed. The succeeding step S6 has been described before, and thus a description thereof will be omitted.

Alternatively, when it is determined that any telephone number is not stored in the dial buffer 26 in step S8, the second timer 28 for counting the second set time, which is predetermined for determining a time-out, is operated in step S9.

The time-out is a function of determining that the transceiver of the ordinary telephone 2 is not exactly put on a predetermined position on the body thereof when a telephone number is not input for a predetermined period of time in an off-hook state and informing a user of this situation to allow the user to put the transceiver on the exact position.

Accordingly, after operating the second timer 28 in step S9, the controller 22 compares a counting time received from the second timer 28 with the predetermined second set time to check whether the counting time exceeds the second set time. That is, the controller 22 checks whether the condition of time-out is made.

When it is determined that the counting time of the second timer 28 exceeds the second set time, the controller 22 generates a control signal for generating a busy tone (tone indicating that the line is busy) in step S11.

The control signal is transmitted to a controller, which controls the overall operation of the ordinary telephone 2 although not shown, sequentially through the first interface circuit 20, second interface circuit 16 and the third interface circuit 10 of the ordinary telephone 2. Thereafter, the busy tone is output through the receiver of the transceiver under the control of the controller of the ordinary telephone 2.

Then, the user can take an appropriate action, for example, exactly putting the transceiver on the predetermined position on the body of the ordinary telephone 2, after hearing the busy tone.

In a method of transmitting a telephone number in a WLL system according to the present invention, when a user presses a hook switch for a short time and instantly releases it in an ordinary telephone connected to a WLL terminal after inputting a telephone number, a flash signal is generated and recognized by the WLL terminal. Accordingly, the telephone number input by the user is immediately dialed by the WLL terminal so that the user can hear a ring back tone immediately after inputting the telephone number. Therefore, the present invention can serve users' convenience in the WLL system and improve the functions of the WLL terminal.

Although this invention has been described in terms of a preferred embodiment, it will be understood that various changes and modifications may be made to the described embodiment without departing from the spirit and scope of the invention.

For example, in this embodiment of the present invention, a hook switch is used for generating a flash signal. However, a method of transmitting a telephone number according to the present invention can also be applied when an asterisk (*) button or a sharp (#) button provided in an ordinary telephone is used for generating the flash signal in stead of the hook switch. The spirit of this invention will be more apparent with the claims described below.

What is claimed is:

1. A method of transmitting a telephone number in a wireless local loop (WLL) system including a WLL system controller, WLL system base station, WLL terminal and an ordinary telephone connected to the WLL terminal, the method comprising the steps of:

checking the state of a hook switch of the ordinary telephone connected to the WLL terminal;

determining whether a telephone number is input, when an off-hook sate is determined;

storing the telephone number in a dial buffer when it is determined that a telephone number is input; and continuously checking whether a flash signal is input while the input telephone number is being stored in the dial buffer, and transmitting the telephone number stored in the dial buffer to the WLL system base station when the flash signal is input.

2. The method of claim 1, wherein the flash signal is generated when the hook switch is pressed and immediately released after the telephone number is input in the ordinary telephone, and is transmitted to the WLL terminal, the flash signal being different from a telephone number signal.

3. The method of claim 1, further comprising the steps of:

checking the state of the dial buffer when there is no input of telephone number in the off-hook state;

operating a first timer for counting a first set time for determining the end of digits when it is determined that a telephone number is stored in the dial; and checking whether the first set time has elapsed, and transmitting the telephone number stored in the dial buffer to the WLL system base station when it is determined that the first set time has elapsed.

4. The method of claim 1, further comprising the steps of:

checking the state of the dial buffer when there is no input of a telephone number in the off-hook state, and operating a second timer for counting a second set time for determining a time-out when any telephone number is not stored in the dial buffer; and transmitting a busy tone to an ordinary telephone when it is determined that the second set time has elapsed to allow a user to hear the busy tone.

5. The method of claim 4, wherein the time-out is a function which is set for informing the user that the user did not input a telephone number for a predetermined period of time in the off-hook state.

* * * * *